Figure 1:
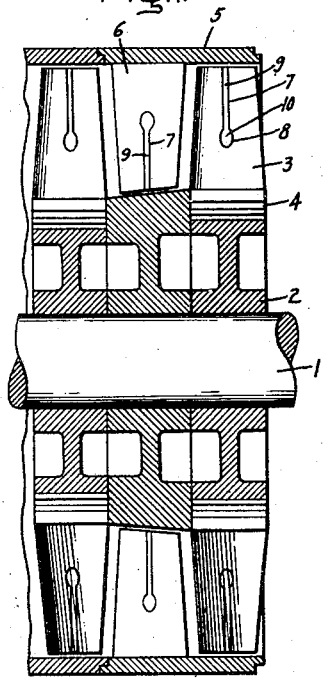

Dec. 17, 1946.  A. HOWARD  2,412,615

BLADED MACHINE ELEMENT

Filed April 16, 1943

Inventor:
Alan Howard,
Harry E. Dunham
by His Attorney.

Patented Dec. 17, 1946

2,412,615

UNITED STATES PATENT OFFICE 2,412,615

BLADED MACHINE ELEMENT

Alan Howard, Schenectady, N. Y., assignor to General Electric Company, a corporation of New York Application April 16, 1943, Serial No. 483,309

3 Claims. (Cl. 253—77)

The present invention relates to bladed machine elements, such as the rotors and stators of compressors, turbines and the like. Such machine elements comprise a body having a plurality of circumferentially spaced radially extending blades carried thereby, the bases of the blades being attached to the body by suitable means. During operation, such blades are subjected to forces of considerable magnitude due to the high speed at which such machines rotate and to the flow of elastic fluid through the passages between the blades. These forces have a tendency to set up vibration in the blades; such vibration may result in failure of the blades due to fatigue of the blade metal. My invention is especially useful in connection with the blades of a rotor since it is in rotor blades that vibrations are most likely to occur. However, it may be used to advantage in connection with the non-rotating blades of a stator.

The object of my invention is to provide an improved structure wherein there is embodied directly on the blade itself means for preventing occurrence therein of harmful vibrations, and for a consideration of what I believe to be novel and my invention, attention is directed to the following specification and to the claims appended thereto.

According to my invention, I embody directly in the blade body, material having a high vibration damping coefficient or material so arranged as to provide rubbing friction, the embodied material serving to dampen or suppress vibrations in the blade body. In the case of material so arranged as to provide rubbing friction, it may or may not be also material having a high vibration damping coefficient.

In carrying out my invention, I may provide a transverse slot in the blade body which extends longitudinally of the blade body from its outer end or tip portion toward its base or base portion. The slot separates the thick-edged inlet portion from the thin-edged outlet portion of the blade, which is generally airfoil-shaped in cross section. The slot is so located that the inlet and outlet portions of the blade on opposite sides of the slot have different natural frequencies of vibration in a direction normal to the width or chord of the blade. The slot is filled with an insert of suitable material, the material preferably, but not necessarily, having a high vibration damping coefficient. For example, a strip of metal such as an alloy of manganese and copper (for example, an alloy comprising 75% manganese and 25% copper) may be inserted in the slot and fixed in place by brazing, peening or the like, the arrangement being such that the strip is in part free so that if vibration tends to be set up, rubbing action will occur to dampen it. At the same time, the alloy, due to its inherent characteristics, will function to absorb vibrations. The strip may have a bulbous inner end which fits in a transverse opening of the blade for anchoring the strip in the blade. Also, the slot may be curved so that centrifugal force tends to straighten the insert, thus insuring frictional contact with both sides of the slot. Instead of a metal strip, I may in some application utilize a non-metallic substance, such as rubber or the like; and the substance, in the case of rubber or the like, may be vulcanized or bonded in the slot directly to the blade material. Also, according to my invention, in the case of blades made by casting in a mold, the insert may be placed in the mold and the blade material cast around it.

Figure 2:
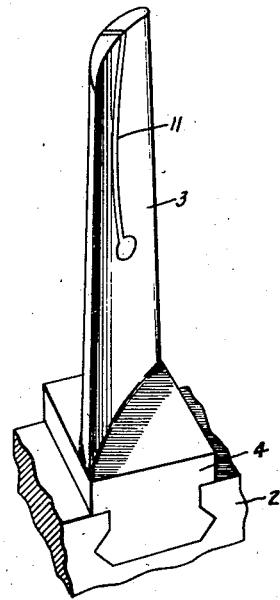
Figure 4:
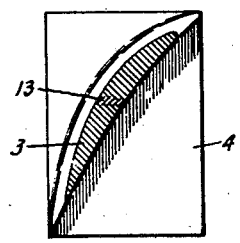
Figure 5:
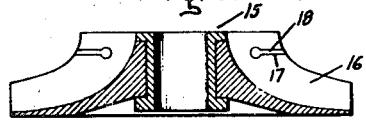

In the drawing, Fig. 1 is a longitudinal sectional view of a portion of an axial fluid compressor provided with blades embodying my invention; Fig. 2 is a perspective view of a blade such as is used in elastic fluid turbines embodying my invention; and Figs. 3, 4 and 5 are sectional views showing modifications.

Referring to the drawing, 1 indicates a shaft on which is mounted a plurality of disks 2 to the peripheries of which are attached rings of compressor blades, the blade bodies being indicated at 3 and the blade bases at 4. The blades may be attached to the disks 2 by any suitable means, a dovetail connection being indicated in the present instance. The casing or stator of the compressor is indicated at 5 and the intermediate blades are indicated at 6. According to the embodiment of my invention shown in Fig. 1, the blades are provided with longitudinally extending slots 7 having enlarged inner ends 8 and located in such slots are strips 9 having bulbous inner ends 10 located in the enlarged ends 8. The strips 9 may comprise suitable metal, such as the alloy referred to above, and in addition to being held in the slots by the bulbous ends, they may be brazed or soldered along one or both sides or they may be peened into position. In any event, the arrangement is such that the fastening means embraces only a part of the insert so that a part is left free for rubbing action with adjacent portions of the blade body. Slot 7 is so located that the two parts of the blade forming inlet and outlet portions respectively on opposite sides of the slot have different natural vibration periods. With this arrangement, vibrations which tend to be set up in the blades during operation are effectively dampened out by rubbing action between the blade material and the inserts. By locating the slot in the blade body in a way such that the two parts have different natural vibration periods, then when the blade body tends to vibrate in the fundamental node with the mode at the base, the two parts will tend to have different amplitudes of motion. This means that losses will occur in the inserted material or in the friction set up by the differential motion. This will remove energy from the vibration and cause it to stop. In fact, in many cases vibration will never start because it will have no opportunity to build up.

In Fig. 2 is shown a blade of the type used in elastic fluid turbines. With this arrangement, the slot 11 in which vibration damping material is inserted is shown as being curved. Otherwise, the arrangement may be the same as that shown in Fig. 1. By making the slot curved, centrifugal force tends to straighten the insert in the slot, thus insuring frictional contact with both sides of the slot. In Fig. 2, the extent of the curvature of the slot is exaggerated for purposes of illustration.

Figure 3:
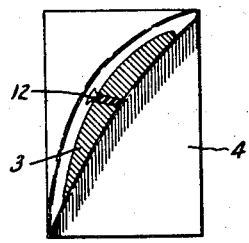

Fig. 3 shows a transverse sectional view of a blade wherein the insert 12 is formed of a material having a high vibration damping coefficient, such as rubber for example, which material is vulcanized or bonded directly to the material of the blade body. Otherwise, the arrangement shown in Fig. 3 may be the same as that shown in either Fig. 1 or Fig. 2.

In Fig. 4 is shown a modification wherein the insert 13 is cast directly into the metal of the blade body. In this case, the insert which is formed of a material having a high vibration damping coefficient, such as the alloy above referred to, for example, is placed in the mold in which the blade is to be cast after which the molten blade material is poured into the mold and permitted to harden around the insert. The molten material serves partly to fuse the material of the insert with the result that the insert is fused directly to the blade body forming in substance an integral structure. In the arrangement shown in Fig. 4, the insert may be either straight or curved, as found desirable.

The slots may have a length in a radial direction less than the radial length of the blade. In the present instance, the slots are shown as extending approximately one-half the length of the blade. However, they may be either longer or shorter than shown.

In Fig. 5 is shown an impeller 15 of a centrifugal compressor having blades 16 provided with slots 17 in which are inserts 18 embodying my invention in any of its aspects.

My invention finds special utility in the case where the blades are supported at their inner ends and are not provided with covers or tie wires as such blades are more subject to vibrations. However, the invention is not limited thereto necessarily.

Since by my invention, vibrations are quickly dampened out or prevented altogether from building up, it is possible to retain the blades in position on the disks under conditions which would otherwise cause failure by fatigue. As a result, by my invention, I am enabled to use thinner blades of better aerodynamic shape than heretofore.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A blade for use in turbines, compressors and like rotary machines subject to vibration during operation, said blade having a fixed base portion and a free tip portion and being substantially airfoil-shaped in section, the blade having a transverse slot perpendicular to the chart of the blade extending from the tip portion towards the central portion of the blade and forming inlet and outlet portions respectively on opposite sides of the slot, which portions have different natural frequencies of vibration in a direction transverse to the chord, said slot being curved throughout its length and having an enlargement near its inner end, and a material having a high vibration damping coefficient substantially filling the slot and anchored in the enlargement.

2. A blade for a turbo-machine subject to vibration during operation, said blade being arranged in a substantially radial direction relative to the axis of rotation with its root portion fixed and its tip portion free to vibrate and having an appreciable radial length with a chord dimension of less magnitude and a thickness of still less magnitude, said blade having a transverse slot extending therethrough in a direction normal to the chord and extending in a substantially radial direction from the free tip to the mid-portion of the blade, a material with good vibration damping characteristics filling the slot and anchored therein, said slot dividing the free end portion of the blade into an inlet portion and an outlet portion having different natural frequencies of vibration in a direction transverse to the chord.

3. A blade for a turbo-machine rotor subject to vibration during operation, said blade being arranged in a substantially radial direction relative to the axis of rotation with its root portion fixed and its tip portion free to vibrate and having an appreciable radial length with a chord dimension of less magnitude and a thickness of still less magnitude, said blade having a transverse slot extending therethrough in a direction normal to the chord and extending in a substantially radial direction from the free tip to the mid-portion of the blade, a material with good vibration damping characteristics filling the slot and anchored therein, said slot dividing the free end portion of the blade into an inlet portion and an outlet portion having different natural frequencies of vibration in a direction transverse to the chord, said slot being curved throughout its length in such a manner that centrifugal force acting on the material in the slot will cause said material to tend to assume a more nearly radial direction and thereby increase the pressure of said material against the walls of the slot to increase the frictional vibration damping effect.

ALAN HOWARD.